No. 728,258. Patented May 19, 1903.

UNITED STATES PATENT OFFICE.

THEODORE GAILLARD LOCKWOOD, OF CHESTER, SOUTH CAROLINA.

INCRUSTATION PREVENTIVE.

SPECIFICATION forming part of Letters Patent No. 728,258, dated May 19, 1903.

Application filed October 9, 1902. Serial No. 126,425. (No specimens.)

*To all whom it may concern:*

Be it known that I, THEODORE GAILLARD LOCKWOOD, a citizen of the United States of America, residing at Chester, in the county of Chester and State of South Carolina, have invented certain new and useful Improvements in Compounds for Cleaning and Preventing Incrustation in Steam-Boilers, of which the following is a specification.

The object of the invention is to produce a compound which may be mixed and put into the boiler with the feed-water and which will so purify the water that no incrustation will be formed in the boiler and which will thoroughly remove any incrustation which may have been already formed in the boiler.

In preparing this compound I use the following ingredients, in substantially the proportions stated, to wit: one cord of saw-palmetto root mixed with four hundred gallons of water containing an amount of tannic acid such as is found in the water of the St. Johns river in Florida or any of its tributaries, or pure water, such as rain-water, may be used and tannic acid combined artificially therewith in the proportions of five per cent., more or less, of tannic acid to ninety-five per cent. of water, or the tannic acid may be omitted. These ingredients are thoroughly commingled and concentrated or boiled down to a consistency of thin cream, the proportions above given yielding about one hundred gallons, more or less, of the finished compound in condition ready for use.

In using the above-named composition about from one pint to two quarts thereof is put into the boiler with the feed-water, the amount being regulated according to the quantity and quality of the incrustation. This amount will usually last for about twenty-four hours, more or less, according to the existing conditions.

By the use of the above compound mixed with the feed-water the incrustation usually resulting from the action of the water on the metal is prevented and great expense saved over the ordinary devices and methods used for removing such incrustation.

It is to be understood that the proportions may be varied and minor details changed without departing from the scope and principle of the invention.

I claim as my invention—

1. A composition for preventing incrustation in steam-boilers consisting of a concentrated extract of saw-palmetto root substantially as described.

2. A composition for preventing incrustation in steam-boilers consisting of a concentrated extract of saw-palmetto containing a small portion of tannic acid, substantially as described.

THEO. GAILLARD LOCKWOOD.

Witnesses:
C. W. MORRISETT,
S. M. McCOLL.